United States Patent
Satheesh et al.

(10) Patent No.: US 11,526,345 B2
(45) Date of Patent: Dec. 13, 2022

(54) PRODUCTION COMPUTE DEPLOYMENT AND GOVERNANCE

(71) Applicant: Oracle Financial Services Software Limited, Mumbai (IN)

(72) Inventors: Shilpa Satheesh, Kochi (IN); Tara Kant, Bengaluru (IN); Rajaram Narasimha Vadapandeshwara, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 92 days.

(21) Appl. No.: 17/204,651

(22) Filed: Mar. 17, 2021

(65) Prior Publication Data

US 2022/0300268 A1  Sep. 22, 2022

(51) Int. Cl.
*G06F 9/445* (2018.01)
*G06F 8/65* (2018.01)

(52) U.S. Cl.
CPC .................... *G06F 8/65* (2013.01)

(58) Field of Classification Search
CPC ........................................................ G06F 8/65

USPC ........................................................ 717/168
See application file for complete search history.

(56) References Cited

U.S. PATENT DOCUMENTS

2014/0053261 A1\* 2/2014 Gupta ................. G06F 11/3013
717/171

\* cited by examiner

*Primary Examiner* — Chuck O Kendall
(74) *Attorney, Agent, or Firm* — Kilpatrick Townsend & Stockton LLP

(57) ABSTRACT

Techniques for automatically deploying a version of a compute, both rule based and model based, with its dependencies when approved for deployment using one or more governance processes. One technique includes generating a compute fitting defined requirements and capable of executing on a defined model objective, generating a deployable archive bundle of the compute with dependencies based on a record of a lineage of the logical building blocks in dependency, analyzing performance of the compute with respect to a production compute deployed within a production environment, determining the performance of the compute is superior to the performance of the production compute based on the analyzing, and replacing the production compute in the production environment with the compute using the deployable archive bundle to facilitate deployment.

20 Claims, 12 Drawing Sheets

PRODUCTION COMPUTE DEPLOYMENT AND GOVERNANCE

FIELD OF THE INVENTION

The present disclosure relates generally to production compute deployment and governance, and more particularly, to techniques for automatically deploying a version of a compute, both rule based and model based, with its dependencies when approved for deployment using one or more governance processes.

BACKGROUND

Data science and data modeling are becoming core capabilities for solving complex real-world problems, transforming industries, and delivering value in all domains. Therefore, many enterprises are investing in their data science teams and modeling capabilities to develop computes that can deliver business value to their users. Computes, both rule based and model based, are key resources that allow users such as enterprises to carry out computational abilities via a series of instructions used by applications and systems. As computes become critical to business functions, new requirements have emerged to ensure quality and to comply with legal and regulatory obligations. The deployment and modification of computes can have far-reaching impacts on customers, employees, partners, and investors so clear practices must be established to ensure they are managed consistently and to minimize risk. Production governance sets the rules and controls for computes such as machine-learning models running in production, including access control, testing, and validation, change and access logs, and traceability of model results. With production governance in place, enterprises can scale compute investments and provide legal and compliance reports on the use of computes.

BRIEF SUMMARY

Techniques are provided (e.g., a method, a system, non-transitory computer-readable medium storing code or instructions executable by one or more processors) for automatically deploying a version of a compute, both rule based and model based, with its dependencies when approved for deployment using one or more governance processes.

In various embodiments, a method is provided that comprises: generating, by a data processing system, a compute fitting defined requirements and capable of executing on a defined model objective, where the generating comprises recording logical building blocks that make up the compute and dependencies of the logical building blocks as mappings in order to maintain a record of lineage of the logical building blocks in dependency; generating, by the data processing system, a deployable archive bundle of the compute with dependencies based on the record of the lineage of the logical building blocks in dependency; analyzing, by the data processing system, performance of the compute with respect to a production compute deployed within a production environment, where the production compute fits the requirements and executes the model objective; determining, by the data processing system, the performance of the compute is superior to the performance of the production compute based on the analyzing of the performances; and in response to determining the performance of the compute is superior to the performance of the production compute, replacing, by the data processing system, the production compute in the production environment with the compute, where the replacing comprises unpacking the deployable archive bundle and deploying the compute in the production environment with dependencies based on the record of the lineage of the logical building blocks in dependency.

In some embodiments, the analyzing of the performances comprises a qualitative assessment and/or a quantitative assessment.

In some embodiments, the qualitative assessment comprises a user comparing outputs and one or more metrics of performance for the compute against the outputs and the one or more metrics for performance of the production compute, and determining whether the performance of the compute is superior to the performance of the production compute based on the comparing.

In some embodiments, the quantitative assessment comprises the data processing system comparing one or more metrics of performance for the production compute against a baseline performance, when the one or more metrics of performance for the production compute are less than the baseline performance, comparing the one or more metrics of performance for the compute against the baseline performance, when the one or more metrics of performance for the compute are greater than the baseline performance, determining the performance of the compute is superior to the performance of the production compute.

In some embodiments, the compute is generated using preconfigured script paragraph templates as the logical building blocks and user defined links between the preconfigured script paragraph templates as the dependencies.

In some embodiments, the method further comprises training, testing, and/or validating, by the data processing system, the compute for the model objective, wherein the training, testing, and/or validating generates one or more metrics of performance for the compute that is used in the analyzing the performance of the compute.

In some embodiments, the method further comprise publishing, by the data processing system, the compute within a model repository such that the production environment is made aware of availability of the compute for use in the production environment.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
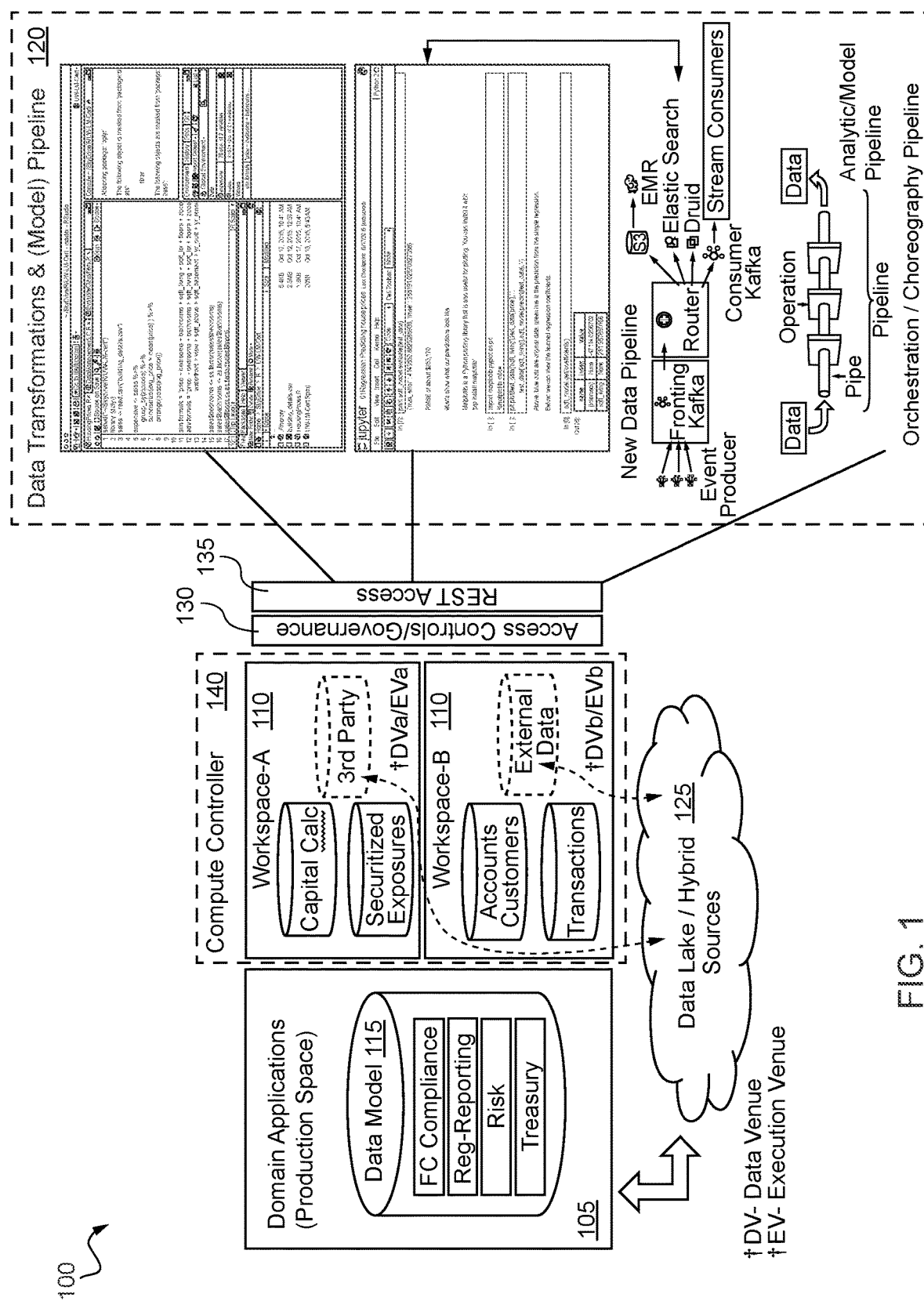
FIG. 1 is an illustration of an application ecosystem in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

INTRODUCTION

The following disclosure describes techniques for automatically deploying a version of a compute, both rule based and model based, with its dependencies when approved for deployment using one or more governance processes. As used herein, a "compute" is a resource (e.g., a rule-based system used to store and manipulate knowledge to interpret information in a useful way, or a model system such as a machine-learning model capable of predicting an output based on a given input) that allows users to carry out computational abilities via a series of instructions used by applications and systems. The compute may be iteratively or interactively developed in a workspace or sandbox and pulled into a user's or business line's workspace (a production environment) from the workspace or sandbox. The workspace or sandbox may be a local silo within the production environment, remote from the production environment, or a hybrid of both local silo and remote. The idea of analytic workspaces and/or sandboxes stems from the need to allow for iterative development/testing/validation of complex computes. For example, typically a compute has many dependencies including building block objects like datasets, variables, filters, external data ingestion definitions, sub-pipelines, constants, etc. These computes in the financial parlance includes both deterministic (rule-based) and model (supervised or semi-supervised or unsupervised).

In such iterative or interactive development processes, the analysts or developers either use existing or template objects (e.g., computes, user interfaces, filters, etc.) as seed to create new objects or script new objects from scratch; but they do not necessarily track linkages between the various objects and all dependencies thereof. When a compute is built, tested, and validated, the deployment or use of the compute in the production environment is a complex endeavor in itself, especially considering in many instances the production environment is already running a batch, pipeline or process that has an approved version of the compute along with other processes. There are process groups, compliance groups, regulatory teams, etc., that handle the aspect of deployment, traceability and lineage. The challenge is being able to deploy and use the compute in the production environment in accordance with the rules and controls of production governance while self-documenting, automatically handling lineage, and producing irrefutable traceability.

To address these challenges, various embodiments provide techniques (e.g., systems, methods, computer program products storing code or instructions executable by one or more processors) for automatically deploying a version of a compute, both rule based and model based, with its dependencies when approved for deployment using one or more governance processes. As described herein, typically a compute, whether rule based or model based, has many dependencies including building block objects like datasets, variables, filters, external data ingestion definitions, sub-pipelines, constants, etc., These dependencies are treated as links within a compound compute object, and the various links and objects making up the compound compute object may be tracked through an association with common tag(s) or by a process that allows the system to record dependencies to a repository for each such compute. For example, an "object-model" data structure allows for a "Lego" like build out of compound compute objects and the compute is the highest granular object in this Lego structure. All objects and links within the Lego structure are tagged or recorded, and thus implicitly all dependencies between objects are maintained and tracked.

When a new version of the compound compute object is approved through quantitative and/or qualitative assessment in accordance with one or more governance processes, (i) a deployable archive bundle is generated of the compute with its dependencies, and (ii) the production environment automatically picks up the deployable archive bundle post any in-progress operation completion and deploys the compute with its dependencies. The deployable archive bundle is essentially a self-documenting object-model that implicitly carries a dependency footprint for the various objects. For example, a listener for a production pipeline control listens and detects a new champion compound compute object that is approved against the pipeline's repertoire of champion objects. This approach automatically detects approved higher version of a compute (or even restores a legacy version of a compute as a gold standard) from within existing repertoire of production objects. When such a change is detected, the production pipeline control picks up the deployable archive bundle for this new champion compound compute object and substitutes the new compute and its dependencies in-place of the current champion version. Substituting the new version between operation executions with full lineage and self-documenting trace history. Advantageously, these techniques cuts the process overload that riddles such compute systems, provides self-documenting compute objects through an object-model that builds lineage graph with each use and derivation, removes the need for manual processes speeding up complex deployment processes, and provides proof of integrity of compute in every environment in the install or tenancy.

In one illustrative embodiment, a computer implemented method is provided for that comprises: generating, by a data processing system, a compute fitting defined requirements and capable of executing on a defined model objective, where the generating comprises recording logical building blocks that make up the compute and dependencies of the logical building blocks as mappings in order to maintain a record of lineage of the logical building blocks in dependency; generating, by the data processing system, a deployable archive bundle of the compute with dependencies based on the record of the lineage of the logical building blocks in dependency; analyzing, by the data processing system, performance of the compute with respect to a production compute deployed within a production environment, where the production compute fits the requirements and executes the model objective; determining, by the data processing system, the performance of the compute is superior to the performance of the production compute based on the analyzing of the performances; and in response to determining the performance of the compute is superior to the performance of the production compute, replacing, by the data processing system, the production compute in the production environment with the compute, where the replacing comprises unpacking the deployable archive bundle and deploying the compute in the production environment with dependencies based on the record of the lineage of the logical building blocks in dependency.

Overview of Application Ecosystem

An application ecosystem refers to business operations supported by a series of related, complimentary applications, the computes included as a part of those applications or as separate entities supporting those applications, and the systems in place for enabling the development, deployment, and production life cycle of the applications and computes. FIG. 1 shows an application ecosystem 100 comprising applications 105 and sandbox/work spaces A-N 110. The applications 105 are within an application domain, which is a mechanism used within the production space to isolate executed software applications from one another so that they do not affect each other. The application domain further includes one or more computes 115 deployed in accordance with aspects of the present disclosure. The one or more computes 115 in the application domain are current version computes (i.e., champion versions of the computes) included as a part of the applications 105 or as separate entities supporting the applications 105. The workspaces A-N 110 provide a workbench for development of applications 105 and computes 115, publication of the applications 105 and computes 115, and deployment of the applications 105 and computes 115 to the application domain. The workspaces A-N 110 may be local, remote, or a hybrid thereof spanning multiple processing and data venues including in-memory processing. The computes in workspace A-N 110 may be developed by the analysts or developers either use existing or template objects (e.g., computes, user interfaces, filters, etc.) as seed to create new compound compute objects or script new compound compute objects from scratch. The computes may be developed for servicing a model objective using data such as internal data, third party data, or external data stored within one or more data stores 125 (e.g., a data lake). The data stores 125 are accessible by the applications 105 and computes 115 deployed within the application domain and can be local, remote or a hybrid thereof.

The applications 105, computes 115, and work spaces A-N 110 are in communication with various batches, pipelines or processes (e.g., data transformations) 120 implemented within the production space via a layer of governance 130 and an interface 135. The workspaces A-N 110 include a compute operations aspect focused primarily on the governance and life cycle management of a wide range of operationalized computes including artificial intelligence (AI) and decision models such as machine learning, knowledge graphs, rules, optimization, linguistic and agent-based models. The compute operations aspect is controlled via compute controller 140, which is configured to deploy, monitor, manage, and govern all computes in production, regardless of how they were created or when and where they were deployed. The compute controller 140 generates a deployable archive bundle of each compute with its dependencies, uses compute monitoring techniques to accommodate changing conditions within the production environment via continuous automated quantitative and/or qualitative assessment, and allows for the production environment to automatically pick up updated versions of computes for the application domain. The layer of governance 130 sets the rules and controls for applications 105 and computes 115 running in production, including access control, testing, and validation, change and access logs, and traceability of model results. The rules and controls include roles and responsibilities, access control (e.g., authorization and authentication policies), change and audit logs, recordings on actions taken for each application 105 and/or computes 115, production testing and validation, maintenance of version libraries, and traceable result output by applications 105 and computes 115 to meet legal and regulatory compliance obligations. The interface 135 is a local or remote application programming interface (API) configured for communication between the applications 105 and computes 115 and the batches, pipelines or processes 120 using one or more protocols (e.g., REST or HTTP).

Compute Development

Figure 2:
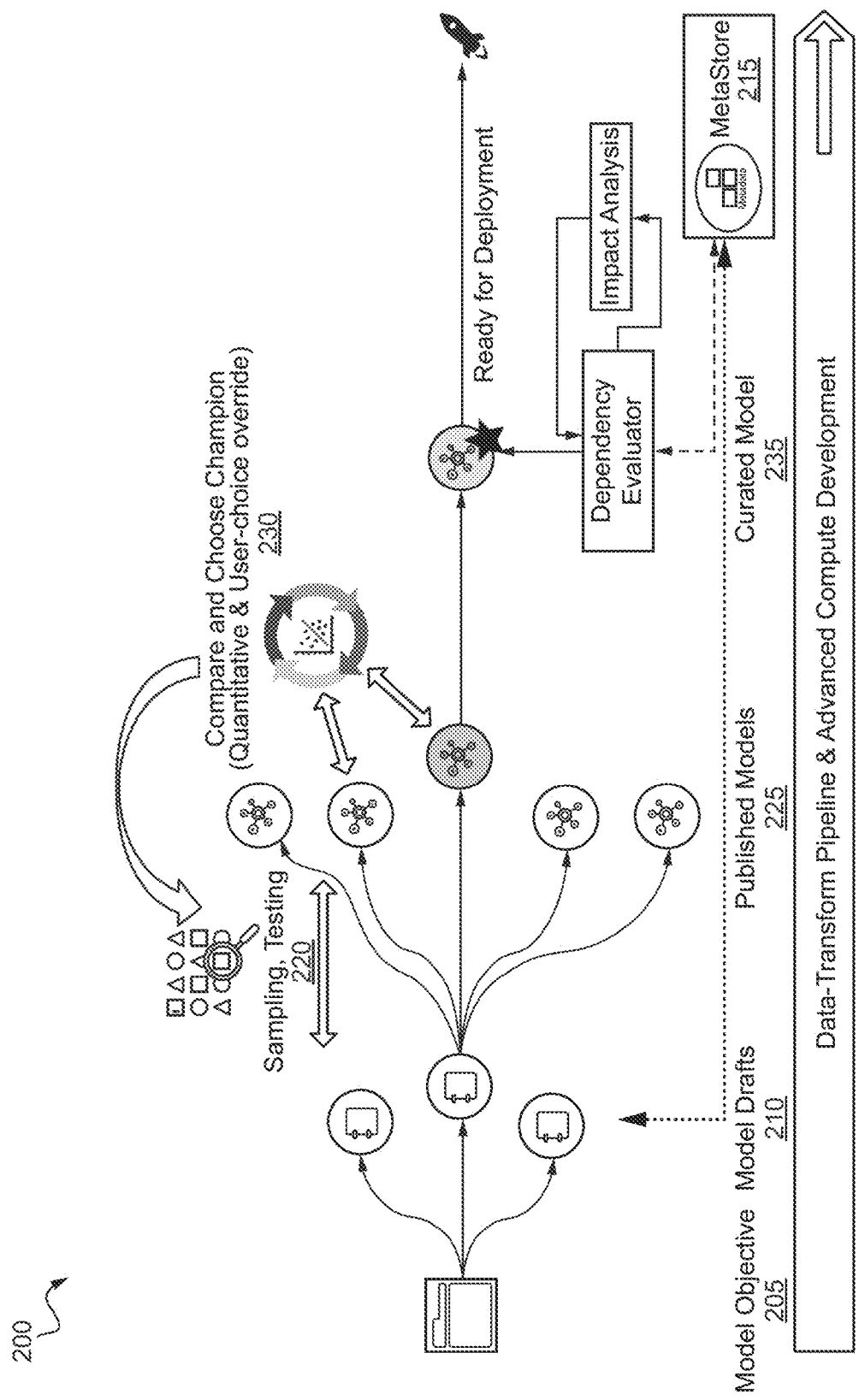
FIG. 2 depicts a compute development life cycle in accordance with various embodiments.

The compute development life-cycle, is a process for planning, creating, testing, and deploying a compute. The compute development life cycle concept applies to a range of hardware and software configurations, as a compute can be composed of hardware only, software only, or a combination of both. There are usually six stages in this life-cycle: requirement analysis, design, development and testing, implementation, documentation, and evaluation. FIG. 2 shows a compute development life cycle 200 in accordance with aspects of the present disclosure. A first step in the life-cycle of compute development is defining a model objective 205. The model objective 205 is the purpose for which the compute is being built. The model objective 205 may also be used as a grouping idea. For example, all computes scripted to achieve a particular goal may fall under a given model objective 205. A user (e.g., a data analysis or developer) may also define sub objectives for better grouping or filtering of their scenarios and logic.

Figure 3:
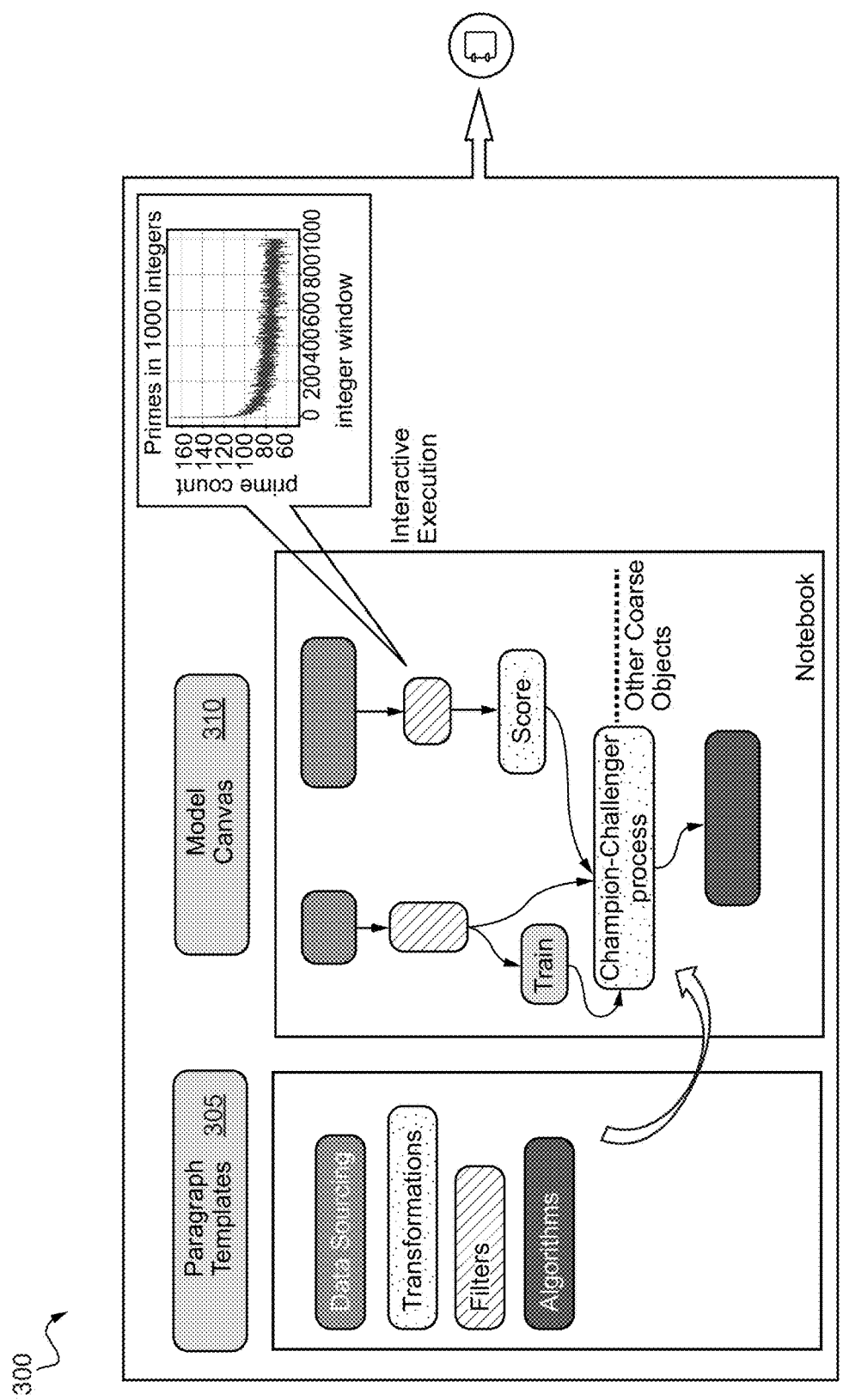
FIG. 3 depicts model development in accordance with various embodiments.

The second step is model development 210, which includes analyzing the model objective 205 to understand all desired requirements for achieving the model objective 205, and an iterative process, in which many computes are derived, tested, and built until a compute fitting the desired requirements and capable of achieving the model objective 205 is built. In this step a logical compute is designed and an actual underlying physical structure required for the logic to start working on the data is created. This process of physicalization of the compute can be merged with additional data resources to create a final compute that the sandbox/workspace can publish and work off of for developing future versions of the compute. FIG. 3 illustrates model development 300 using paragraph templates 305 and a user interface (e.g., GUI) based model canvas 310. The model development 300 is a powerful compute development workbench which enables users to create new computes and keep working with the same computes (i.e., different versions thereof). The workbench may be implement using one or more programming languages such as R, Python, PySpark, PGX (graph), Java, SQL-Interpreters and allows for interactive development and interpreter with scale-out on demand to facilitate development of any number of models simultaneously. A user can define a compute draft for a model objective as a superset of all requirements/techniques using various components/building blocks (e.g., paragraph templates 305) and definitions of how the components/building blocks are pieced together, and depending on testing/validation of various variants of the compute, the user can publish a subset/complete set of paragraph templates 305 as a published compute.

The model development 300 allows a user to choose between freehand scripting of computes or configuring computes using domain tasks, where the domain tasks are preconfigured script paragraph templates 305, or a combination of both approaches. The domain tasks or paragraph templates 305 are files (e.g., Java Archive (JAR) files) containing the files and scripts that are required to create or extend and execute the domain task such as data sourcing, data transformations, filters, algorithms, and the like. Each paragraph template type executes and performs the specific domain task during deployment of the compute in the production environment. The paragraph templates 305 may be located within a directory and/or data store accessible during development of a compute via the model canvas 310. Template tools and canvas tools are provided to assist users in creating paragraph templates 305 and using the paragraph templates 305 to build computes and extend the domain of various tasks. Resources and paragraph templates 305 may be set up in the model canvas 310 and dependencies between the various resources and paragraph templates 305 may be identified and a record thereof maintained. In some instances, security and entitlement tools are provided within the model development 300 to ensure governance over data and metadata access using access-control policies, data filtering by user role or authorization, data jurisdiction or compartmentalization to maintain data separability, and the like during the development and deployment of computes.

With respect back to FIG. 2, the series of steps or tasks (logical building blocks in dependency) implemented by each compute and resources to achieve the model objective is recorded as mappings (these mapping and dependencies are user defined). The metastore 215 records the model building process to maintain a record of the lineage of logical building blocks in dependency, generate a deployable archive bundle of each compute with its dependencies based on the recording, and stores the deployable archive bundle in a data store for use during deployment. The deployable archive bundle contains all the artifacts necessary to deploy the compute in a production or target environment and execute the compute. Fundamentally, the deployable archive bundle includes the lineage of the logical building blocks in dependency for the compute and informs the production environment that in order for the compute to work properly it will need these building blocks to be executed with these defined dependencies and these defined resources. For example, if two computes are to be merged in production for achieving a given business objective or logic and the second compute is dependent upon a specific source data set then that dependency needs to be maintained with the merged second compute. Additionally, if data transformations based on logic are created in the sandbox/workspace that is not part of a core algorithm in the compute this dependency e needs to be maintained with the compute.

The third step is model sampling and testing 215, which includes training, testing, and/or validating the computes for the model objective. For example, in the context of machine-learning models a common task is the construction of algorithms that can learn from and make predictions on data. Such algorithms function by making data-driven predictions or decisions, through building a mathematical model from input data. The data used to build the final model usually comes from multiple datasets. In particular, three datasets are commonly used in different stages of the creation of the model. The model is initially fit on a training dataset, which is a set of examples used to fit the parameters (e.g., weights of connections between neurons in artificial neural networks) of the model. The model (e.g. a neural net or a naive Bayes classifier) is trained on the training dataset using a supervised learning method, for example using optimization methods such as gradient descent or stochastic gradient descent. In practice, the training dataset often consists of pairs of an input vector (or scalar) and the corresponding output vector (or scalar), where the answer key is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units (layers and layer widths) in a neural network). Finally, the test dataset is a dataset used to provide an unbiased evaluation of a final model fit on the training dataset.

Once the compute is trained, tested, and/or validated for the model objective, a fourth step is publishing 225 the compute within a model repository such that one or more production environments are made aware of new versions of computes available for use in a production environment. Published computes are read-only computes that are executable entities provisioned within a champion/challenger framework. Among all the published computes for a given model objective, there is a champion compute (typically deployed in a production environment) and the rest of the published computes for the given model objective automatically become the champion's challengers. In some instances, the new versions of computes may be published and identified for use in replacing champion computes using a publication/subscription paradigm. In other instances, a detection mechanism may be used by the production environment to identifying new compute versions for a champion compute based on the model objective that each compute (challenger and champion) was created to achieve and/or the object models or building blocks making up each compute (challenger and champion) version. The identified computes may then be assessed for use within the production environment in a fifth step that involves a quantitative and/or qualitative assessment process 230. The quantitative and/or qualitative assessment process 230 includes running the challengers (new compute versions) within the development space, while the champion (the current or given compute) continues to run in the production environment, and analyzing the results of the challengers and champion to determine the best performing compute. The analysis is a quantitative and/or qualitative assessment as explained in further detail with respect to FIGS. 5 and 6, and ultimately determines which challenger is the best performer or whether the champion remains the best performer.

The sixth step is conditioned upon a challenger being deemed the best performer (as compared to the current champion). If a challenger is deemed the best performer, then the compute is curated 235 and prepared for deployment. The curating 235 includes obtaining the deployable archive bundle for the challenger deemed the best performer, evaluation of the dependencies for the compute, and an impact analysis of deploying the challenger in the production environment. The deployable archive bundle for the challenger is obtained by the metastore 215 from the data store using an identifier associated with the challenger. An evaluation engine then evaluates the deployable archive bundle to identify the lineage of the logical building blocks in dependency for the compute and any resources required for provisioning of the compute within the production environment (e.g., a given database, a given processing architecture, a given memory requirement, a given CPU requirement, etc.). An impact engine then analyzes the identified lineage of the logical building blocks in dependency for the compute and required resources to determine how the challenger is different from the champion and identify any building blocks and/or variables associated with the compute that will need to be brought into the production environment and how those building blocks and/or variables may impact other aspects of the production environment (e.g., affect downstream processing within a pipeline). The difference between the challenger and the champion may be determined by the impact engine comparing the lineage of the logical building blocks in dependency for the challenger versus the lineage of the logical building blocks in dependency for the champion. Once the curating 235 is complete, the challenger is ready for deployment as discussed with respect to FIG. 4.

Compute Deployment

Figure 4:
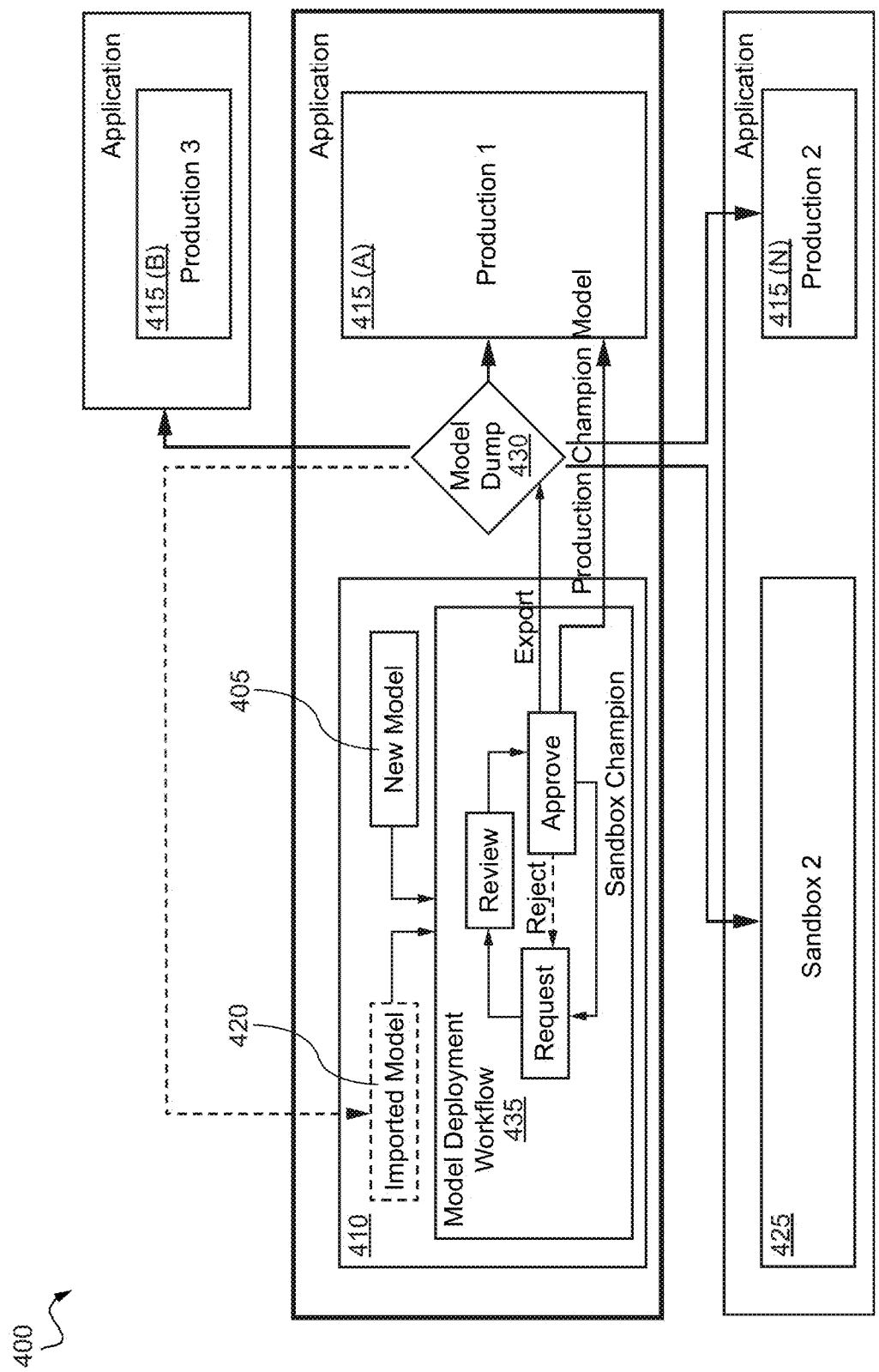
FIG. 4 depicts a compute deployment work flow in accordance with various embodiments.

FIG. 4 shows a compute deployment work flow 400 in accordance with aspects of the present disclosure. A new version of a compute 405 developed in a sandbox/work space environment 410 as described with respect to FIG. 2 can be promoted to a production environment 415 A-N. Alternatively, a new version of a compute 420 approved for deployment (e.g., approved from a different sandbox/work space environment 425 and exported to a model dump 430) can be imported to the sandbox/work space environment 410 and promoted to the production environment 415 A-N. The local new version of a compute 405 and the imported new version of a compute 420 may be published and identified for use in replacing given computes using a publication/subscription paradigm. In other instances, as shown in FIG. 5, a detection mechanism may be used by the production environment to identifying new compute versions for a given compute based on the model objective that each compute (new and current) was created to achieve and/or the object models or building blocks making up each compute (new and current) version.

Figure 6:
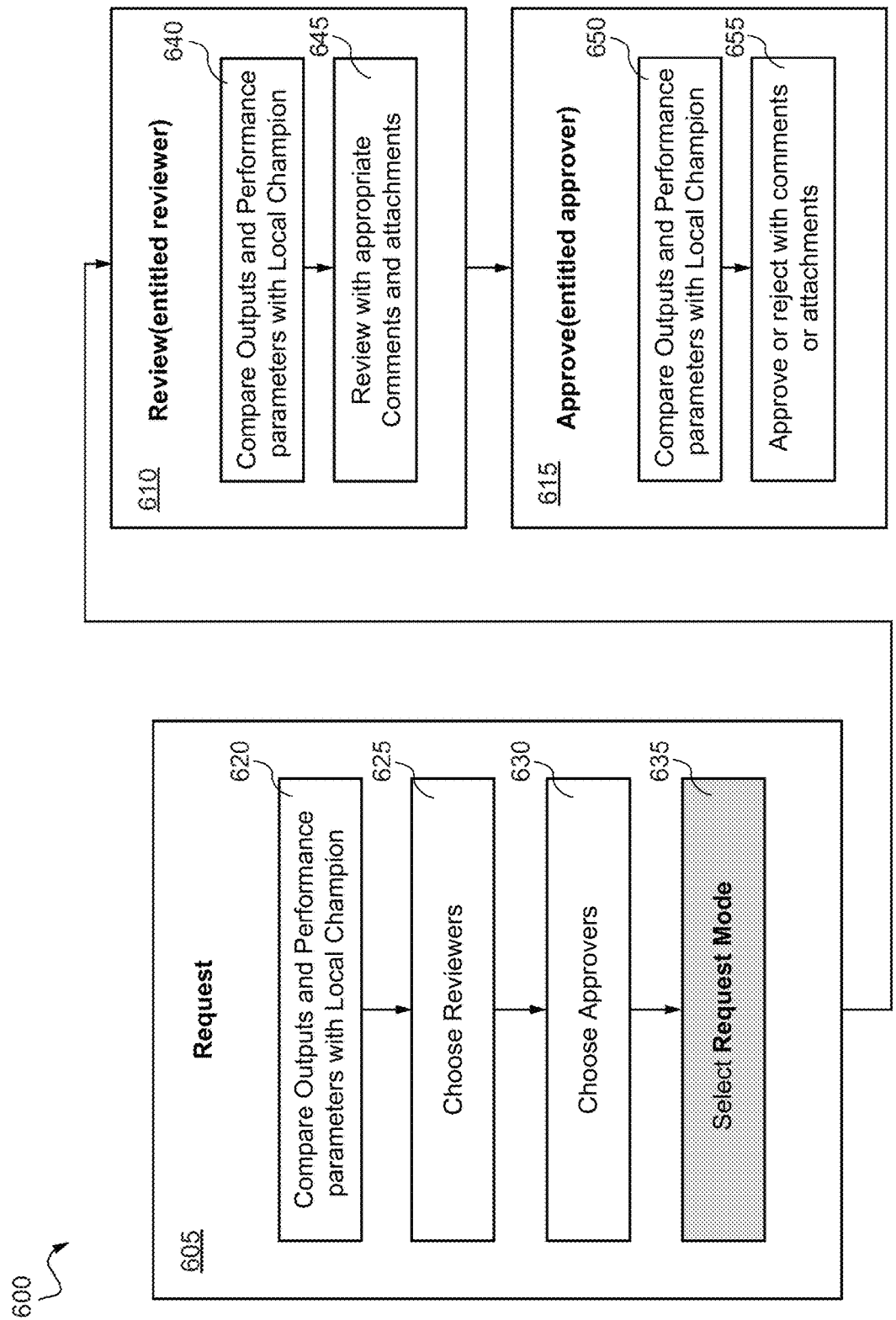
FIG. 6 depicts a qualitative assessment process in accordance with various embodiments.
Figure 8:
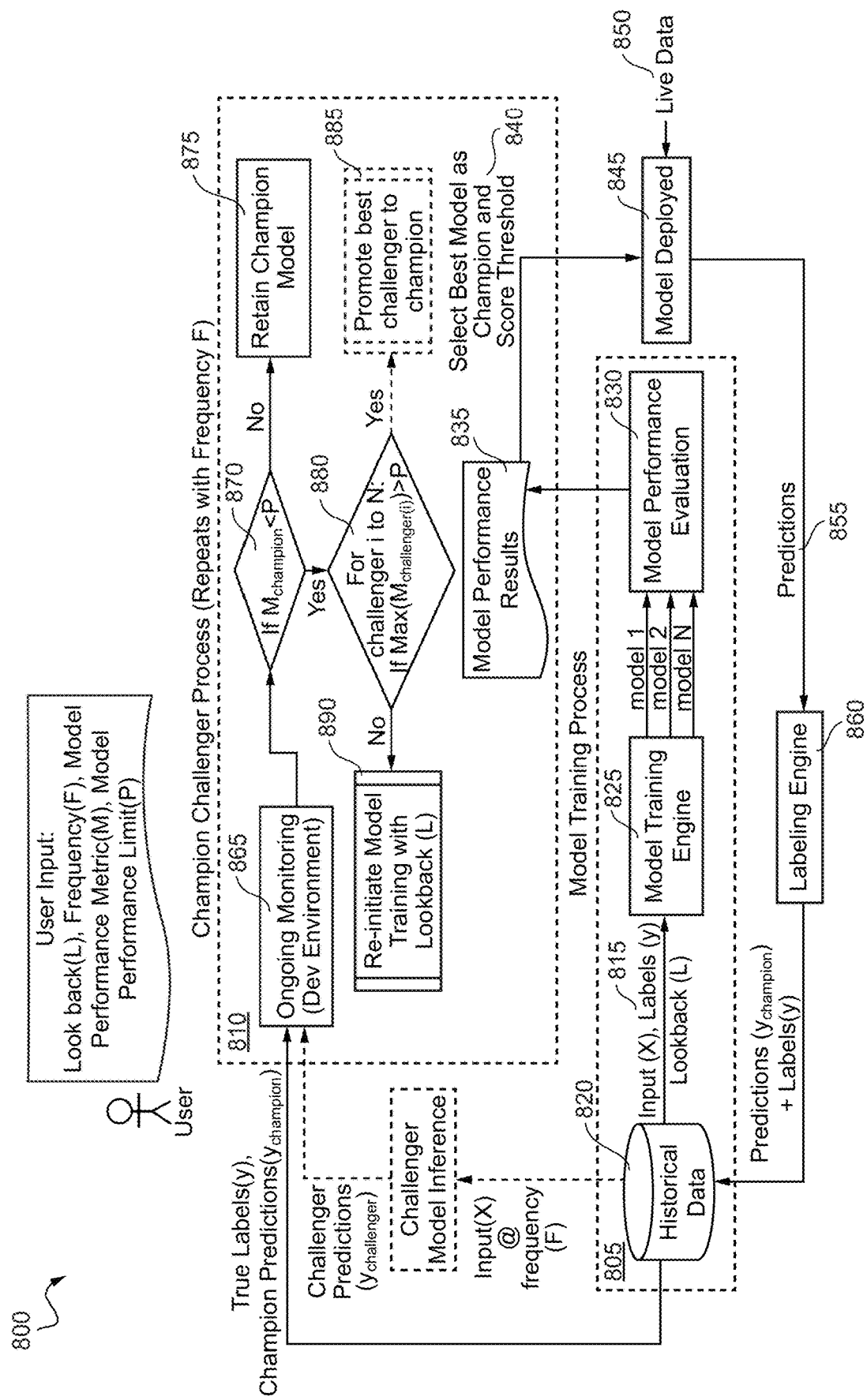
FIG. 8 depicts a quantitative assessment process in accordance with various embodiments.

Once identified, the local new version of the compute 405 in the sandbox/work space environment 425 goes through a quantitative and/or qualitative assessment process 435 (e.g., the quantitative and/or qualitative assessment process 230 described with respect to FIG. 2) before being promoted to the production environment 415 A-N or exported to the model dump 430. The qualitative part of the process 435 is shown in FIG. 6/7 and the quantitative process is shown in FIG. 8. Once identified, the imported new version of a compute 420 in the sandbox/work space environment 425 can be promoted to the production environment 415 or exported to the model dump 430 with or without quantitative and/or qualitative assessment depending on whether the imported new version of the compute 420 has already been assessed for a champion compute to be replaced in the production environment 415 A-N. The promotion and deployment of the new version of a compute 405 or 420 in the production environment 415 comprises unpacking the deployable archive bundle and deploying the compute 405 or 420 in the production environment with dependencies based on the record of the lineage of the logical building blocks in dependency.

The deployable archive bundle contains the compute, dependencies that compute may have (e.g., external data file or file with macro variables and their values, data-movement routines that move data from certain columns to another column either as aggregate or split buckets, certain constants computed during the training process including the placeholders for the constants in the model, any transformations of source data that needs to be applied against production data, etc.). These dependencies are carried as "metadata" or target agnostic definitions that can be converted in production environment to the execution semantics (e.g., SQL or Scala-code or Java or R or Python or anything for which an interpreter is available to convert the meta encoding format to target execution semantics). The meta-info with the deployable archive bundle carries the exact order in which the deployment image is laid out in the target environment and the series of actions to be applied. This meta-info or instruction set is understood by the application ecosystem irrespective of the target environment specifics like OS or middleware or topology.

Figure 5:
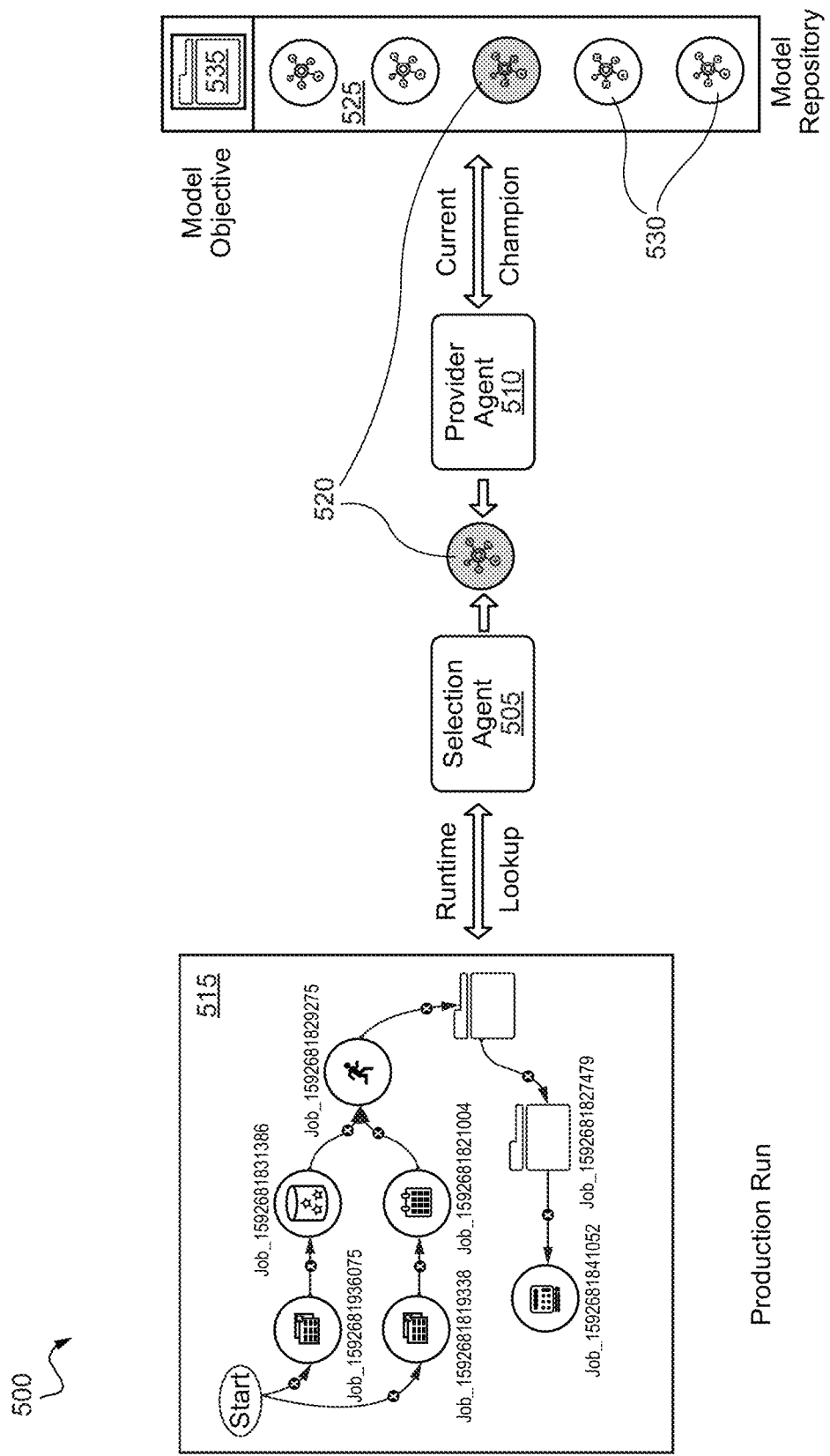
FIG. 5 depicts a detection mechanism in accordance with various embodiments.

FIG. 5 shows a detection mechanism 500 used by the production environment to identify new compute versions for a given compute. The detection mechanism 500 comprises a selection agent 505 and a provider agent 510. The selection agent 505 is configured to select or identify a production run 515 that utilizes a compute that may be replaced with new version of the compute. Essentially, the version of the compute (i.e., champion) provisioned for a production run 515 and/or its associated model objective serve as a placeholder for substitution of new versions of the compute (i.e., challengers). The provider agent 510 is configured to identify the champion 520 for the identified or selected production run 515 from the model repository 525 and any challengers 530 associated with the same model objective 535 and/or object models for possible replacement of the champion 520.

The identification of challengers 530 to replace the champion may be performed using a number of techniques including: (i) version control, (ii) performance assessment, (iii) comparison assessment, or (iv) any combination thereof. The version control includes the provider agent 510 selecting one or more challengers 530 from the model repository 525 that are associated with the same model objective 535 and/or object models associated with the champion 520, comparing version identifiers between the challengers 530 and champion 520, determining, based on the comparison, whether the versions of the one or more challengers 530 are new than the version of the champion 520, and when a version of a challenger 530 is newer than a version of the champion 520, triggering the quantitative and/or qualitative assessment of the version of the challenger 530. Performance assessment includes the provider agent 510 monitoring and assessing performance of a champion 520 provisioned for the production run 515 selected by the selection agent 505 and determining whether the champion 520 had a change in performance, e.g., detection of drift in performance or performance has fallen below a predetermined threshold. Based on the change in performance, the provider agent 510 searches and identifies one or more challengers 530 from the model repository 525 using the model objective 535 and/or object models associated with the champion 520, and triggers the quantitative and/or qualitative assessment of the identified one or more challengers 530. The comparison assessment includes the provider agent searching and identifying one or more challengers 530 from the model repository 525 using the model objective 535 and/or object models associated with the champion 520 provisioned for the production run 515 selected by the selection agent 505, and triggering the quantitative and/or qualitative assessment of the identified one or more challengers 530.

FIG. 6 shows a qualitative assessment process 600 for assessing compute performance. The qualitative assessment process 600 includes a request subprocess 605, a review subprocess 610, and an approve subprocess 615. The request subprocess 605 starts at block 620 where output and performance parameters (e.g., type-I/II errors, specificity, precision or deviation percentage against historical observations, true positive rate, sensitivity, etc.) are obtained from running the identified one or more challengers and the champion on data sets. In some instances, the champion is run on production data sets and the output results are used in the production environment in accordance with normal task execution; whereas the challengers are run on the same production data sets and output results are not used in the production environment. In other instances, the champion is run on a subset of the production data sets and the output results are used in the production environment in accordance with normal task execution; and the challengers are run on another subset of the production data sets and the output results are used in the production environment in accordance with normal task execution. In either event, the performance parameters (e.g., prediction accuracy, processing speed, resource consumption, and the like) of the challengers and champion are obtained while processing the production data sets. Further at block 620, the output results and the performance parameters of the challengers and champion are compared to one another to assess which challenger is the best performer or whether the champion remains the best performer.

At block 625, a reviewer is chosen by the requester to assess the output and performance parameters of the challengers and the champion. The reviewer is one or more users (e.g., data analysts) tasked with analyzing the output and performance parameters of the challengers and the champion based on the comparison to determine which challenger is the best performer or whether the champion remains the best performer for a given model objective. At block 630, an approver is chosen by the requester to approve the challenger or champion identified by the reviewer. The approver is one or more users (e.g., data analysts) tasked with approving the challenger or champion identified by the reviewer for the task of executing on the model objective. A requester may choose the set of reviewer(s) and approver(s) for their challengers and champion from a global list of designated users.

Figure 7:
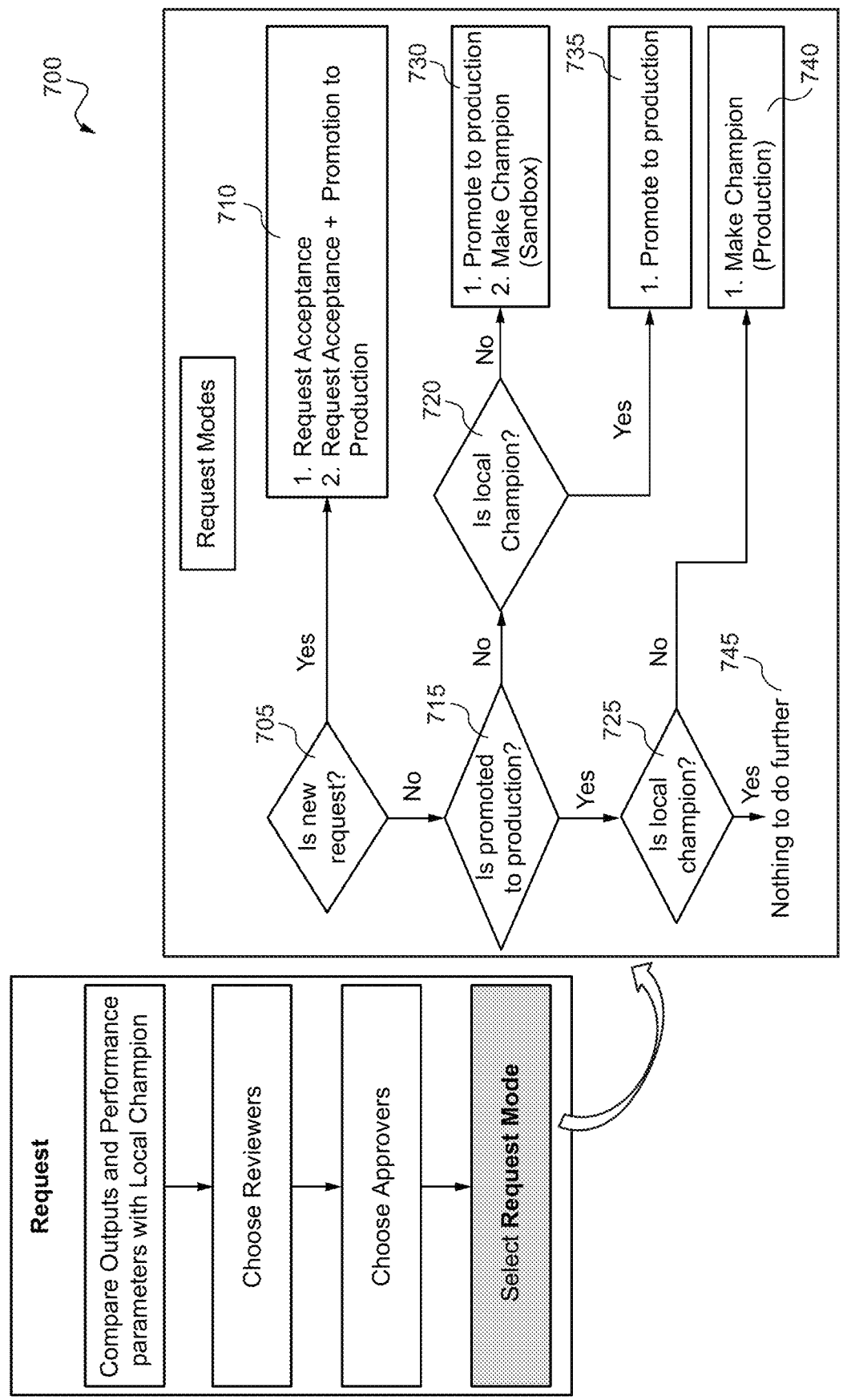
FIG. 7 depicts a request mode selection process as part of the qualitative assessment process in accordance with various embodiments.

At block 635, a request mode is identified for determining what is being requested of the reviewers and approvers. FIG. 7 shows a process 700 for identifying the request mode. At block 705, a determination is made as to whether the request to assess the challengers and champion is a new request. If the request is new then the process continues at block 710, and if the request is old then the process continues at block 715. At block 710, the request is determined to be either for acceptance of a challenger or champion or acceptance of acceptance of a challenger or champion and promotion to production. At block 715, a determination is made as to whether a challenger or champion has been approved for promotion to production. If the challenger or champion has not been approved for promotion to production, the process continues at block 720. If the challenger or champion has been approved for promotion to production, the process continues at block 725. At block 720, a determination is made as to whether the challenger or champion has already been made the local champion. If the challenger or champion has not already been made the local champion, the process continues at block 730 where the request is determined to be for promotion to production and designation as the local champion. If the challenger or champion has already been made the local champion, the process continues at block 735 where the request is determined to be for promotion to production. At block 725, a determination is made as to whether the challenger or champion has already been made the local champion. If the challenger or champion has not already been made the local champion, the process continues at block 740 where the request is determined to be for designation as the local champion. If the challenger or champion has already been made the local champion, the process continues at block 745 where the process ends since the challenger or champion has already been made the local champion and promoted to production.

Once the request mode is determined, the challengers and champion, the comparison of outputs and performance, and the request mode are forwarded to the chosen reviewer(s) for processing in review subprocess 610. The review subprocess 610 starts at block 640 where the output results and the performance parameters of the challengers and champion are compared by the reviewer(s) to one another to assess which challenger is the best performer or whether the champion remains the best performer. At block 645, the reviewer(s) can review and assess the challengers and champion with appropriate comments and even attach relevant documents. Once the review is completed by the reviewer (s), the challengers and champion, the comparison of outputs and performance, the request mode, and the observations and comments from the requester and reviewer are forwarded to the chosen approver(s) for processing in approve subprocess 615. The approve subprocess 615 starts at block 650 where the output results and the performance parameters of the challengers and champion are compared by the approver(s) to one another to assess which challenger is the best performer or whether the champion remains the best performer. At block 655, based on the challengers and champion quantitative measure, observations and comments from the requester and reviewer, the approver(s) finally choose to accept or reject the challenger or champion identified by the reviewer, make the challenger or champion the local champion, and/or promotion the challenger or champion to production. Accordingly, the final assessment is both qualitative and quantitative. Qualitative aspects stem from deep domain expertise where a user may make the call to move the challenger to champion role because the predictions are more applicable and explainable. Whereas, quantitative metrics include ROC/AUC curves to determine whether the champion should remain the champion or whether a challenger should replace the champion.

FIG. 8 shows a quantitative assessment process 800 for assessing compute performance. The quantitative assessment process 800 includes a model training subprocess 805 and a champion challenger subprocess 810. In some instances, the model training subprocess 805, the champion challenger subprocess 810, or both generate quantitative measures and determinations based thereon that are used in the qualitative assessment process 600 described with respect to FIG. 6 for ultimately choosing to accept or reject the challenger or champion identified by the reviewer, make the challenger or champion the local champion, and/or promotion the challenger or champion to production. In other instances, the model training subprocess 805, the champion challenger subprocess 810, or both generate quantitative measures and determinations based thereon that are used (without the qualitative assessment process 600) for ultimately choosing to accept or reject the challenger or champion, make the challenger or champion the local champion, and/or promotion the challenger or champion to production.

The model training subprocess 805 starts at block 815 where historical data 820 is used by a model training engine 825 to train a compute such as a model 1-N. Once trained, the model 1-N are evaluated at block 830 for performance (e.g., prediction accuracy, classification accuracy, computational accuracy, processing speed, etc.) and the performance results 835 (a first type of quantitative measure) are output for further assessment. In some instances, the performance results 835 are used at block 840 to select a best model as the champion and the performance results 835 are set as a score threshold for the champion. At block 845, the champion is deployed in the production environment and used in production for processing live data 850 to generate results 855 (e.g., model predictions) while executing on the model objective. The results 855 may be assessed for performance (a second type of quantitative measure), labeled by a label engine 860 (with association to the champion), and made part of the historical data 820 for subsequent compute training and/or champion challenger monitoring. As should be understood, all other models not selected as the champion may be designated as challengers or subsequent versions of the models may be designated as challengers and the challengers may also be run on live data 850 to generate results 855 (e.g., model predictions) while executing on the model objective. The results 855 from the challengers may or may not be used within the production environment depending on the champion challenger schema presently employed. In any event, the results 855 from the challengers may be assessed for performance (a second type of quantitative measure), labeled by the label engine 860 (with association to the challenger), and made part of the historical data 820 for subsequent compute training and/or champion challenger monitoring.

The champion challenger subprocess 810 starts at block 865 where the champion and challengers are monitored for performance (in some instance this is continuous monitoring; however it should be understood that other type of monitoring could be employed such as periodic or scheduled monitoring). The monitoring includes collecting the results 855 from the champion and challengers and assessment of performance thereof. At block 870, a determination is made as to whether the assessment of performance for the champion is less than a baseline performance (in some instances this baseline performance is the score threshold set for the champion at block 840). In some instances the performance is measured based on ROC/AUC curves, specificity, precision or deviation percentage against historical observations, true positive rate, sensitivity, or any combination thereof. If the assessment of performance for the champion is not less than the baseline performance, the process continues at block 875. If the assessment of performance for the champion is less than the baseline performance, the process continues at block 880. At block 875, the champion is retained as the local champion. At block 880, a determination is made as to whether the MAX assessment of performance for the challengers i-N is greater than the baseline performance. If the MAX assessment of performance for the challengers i-N is greater than the baseline performance, the process continues at block 885 where the challenger with the best performance score is promoted to champion. If the MAX assessment of performance for the challengers i-N is not greater than the baseline performance, the process continues at block 890 where training is reinitiated for the challengers with lookback.

Techniques for Compute Development and Deployment

Figure 9:
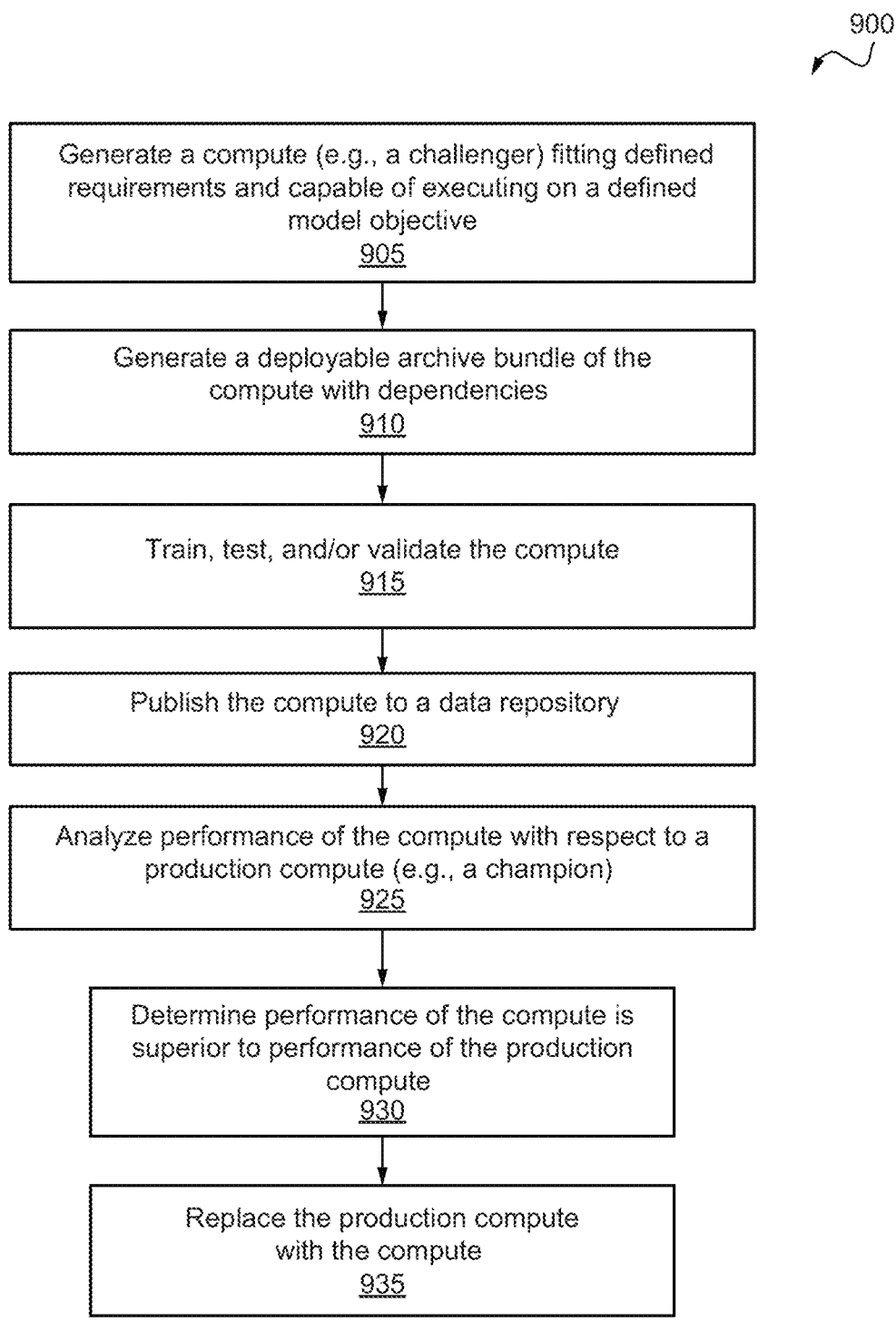
FIG. 9 depicts a flowchart illustrating a process for development and deployment of a compute in accordance with various embodiments.

FIG. 9 illustrates techniques for automatically deploying a version of a compute, both rule based and model based, with its dependencies when approved for deployment using one or more governance processes. Individual embodiments may be described as a process which is depicted as a flowchart, a flow diagram, a data flow diagram, a structure diagram, swim lane diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 9 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 9 is not intended to be limiting. Other sequences of steps may also be performed according to alternative embodiments. For example, in alternative embodiments the steps outlined above may be performed in a different order. Moreover, the individual steps illustrated in FIG. 9 may include multiple sub-steps that may be performed in various sequences as appropriate to the individual step. Furthermore, steps may be added or removed depending on the particular applications. One of ordinary skill in the art would recognize many variations, modifications, and alternatives FIG. 9 depicts a flow diagram 900 illustrating techniques for developing and deploying a compute according to various embodiments. The processing depicted in FIG. 9 may be performed in accordance with the systems and techniques described with respect to FIGS. 1-8. At block 905, a compute (e.g., a challenger) is generated, by a data processing system, fitting defined requirements and capable of executing on a defined model objective. The generating comprises recording logical building blocks that make up the compute and dependencies of the logical building blocks as mappings in order to maintain a record of lineage of the logical building blocks in dependency. In some instances, the compute is generated using preconfigured script paragraph templates as the logical building blocks and user defined links between the preconfigured script paragraph templates as the dependencies.

At block 910, a deployable archive bundle of the compute with dependencies is generated by the data processing system based on the record of the lineage of the logical building blocks in dependency. At block 915, the compute is trained, tested, and/or validated, by the data processing system, for the model objective. The training, testing, and/or validating generates one or more metrics of performance for the compute that may be used in the analyzing the performance of the compute. At block 920, the compute is published by the data processing system within a model repository such that a production environment is made aware of availability of the compute for use in the production environment.

At block 925, performance of the compute is analyzed by the data processing system with respect to a production compute (e.g., a champion) deployed within a production environment. The production compute fits the requirements and executes the model objective. The analyzing of the performances may comprise a qualitative assessment and/or a quantitative assessment. The qualitative assessment may comprise a user comparing outputs and one or more metrics of performance for the compute against the outputs and the one or more metrics for performance of the production compute, and determining whether the performance of the compute is superior to the performance of the production compute based on the comparing. The quantitative assessment comprises the data processing system comparing one or more metrics of performance for the production compute against a baseline performance, when the one or more metrics of performance for the production compute are less than the baseline performance, comparing the one or more metrics of performance for the compute against the baseline performance, and when the one or more metrics of performance for the compute are greater than the baseline performance, determining the performance of the compute is superior to the performance of the production compute.

At block 930, the performance of the compute is determined by the data processing system to be superior to the performance of the production compute based on the analyzing of the performances. At block 935, in response to determining the performance of the compute is superior to the performance of the production compute, the data processing system replaces the production compute in the production environment with the compute. The replacing comprises unpacking the deployable archive bundle and deploying the compute in the production environment with dependencies based on the record of the lineage of the logical building blocks in dependency.

Illustrative Systems

Figure 10:
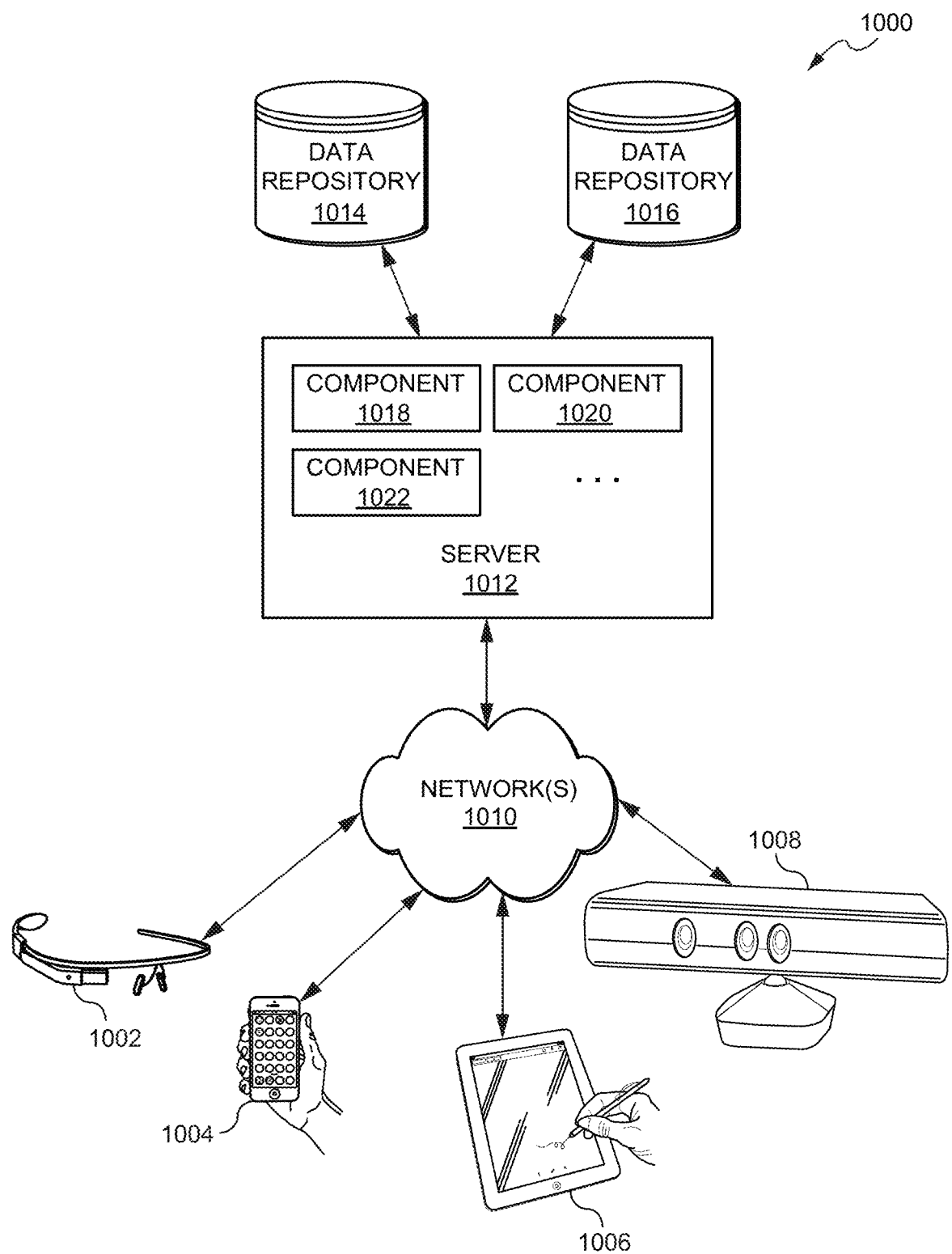
FIG. 10 depicts a simplified diagram of a distributed system for implementing various embodiments.

FIG. 10 depicts a simplified diagram of a distributed system 1000 for implementing an embodiment. In the illustrated embodiment, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various embodiments, server 1012 may be adapted to run one or more services or software applications that enable deploying a version of a compute, both rule based and model based, with its dependencies when approved for deployment using one or more governance processes.

In certain embodiments, server 1012 may also provide other services or software applications that can include non-virtual and virtual environments. In some embodiments, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The embodiment shown in FIG. 10 is thus one example of a distributed system for implementing an embodiment system and is not intended to be limiting.

Users may use client computing devices 1002, 1004, 1006, and/or 1008 to develop and deploy a version of a compute in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g. iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization such as one or more flexible pools of logical storage devices that can be virtualized to maintain virtual storage devices for the server. In various embodiments, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain embodiments. For example, one or more of the data repositories 1014, 1016 may be used to store information for developing and deploying a version of a compute. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain embodiments, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1014, 1016 may also be used by applications to store application data. The data repositories used by applications may be of different types such as, for example, a key-value store repository, an object store repository, or a general storage repository supported by a file system.

Figure 11:
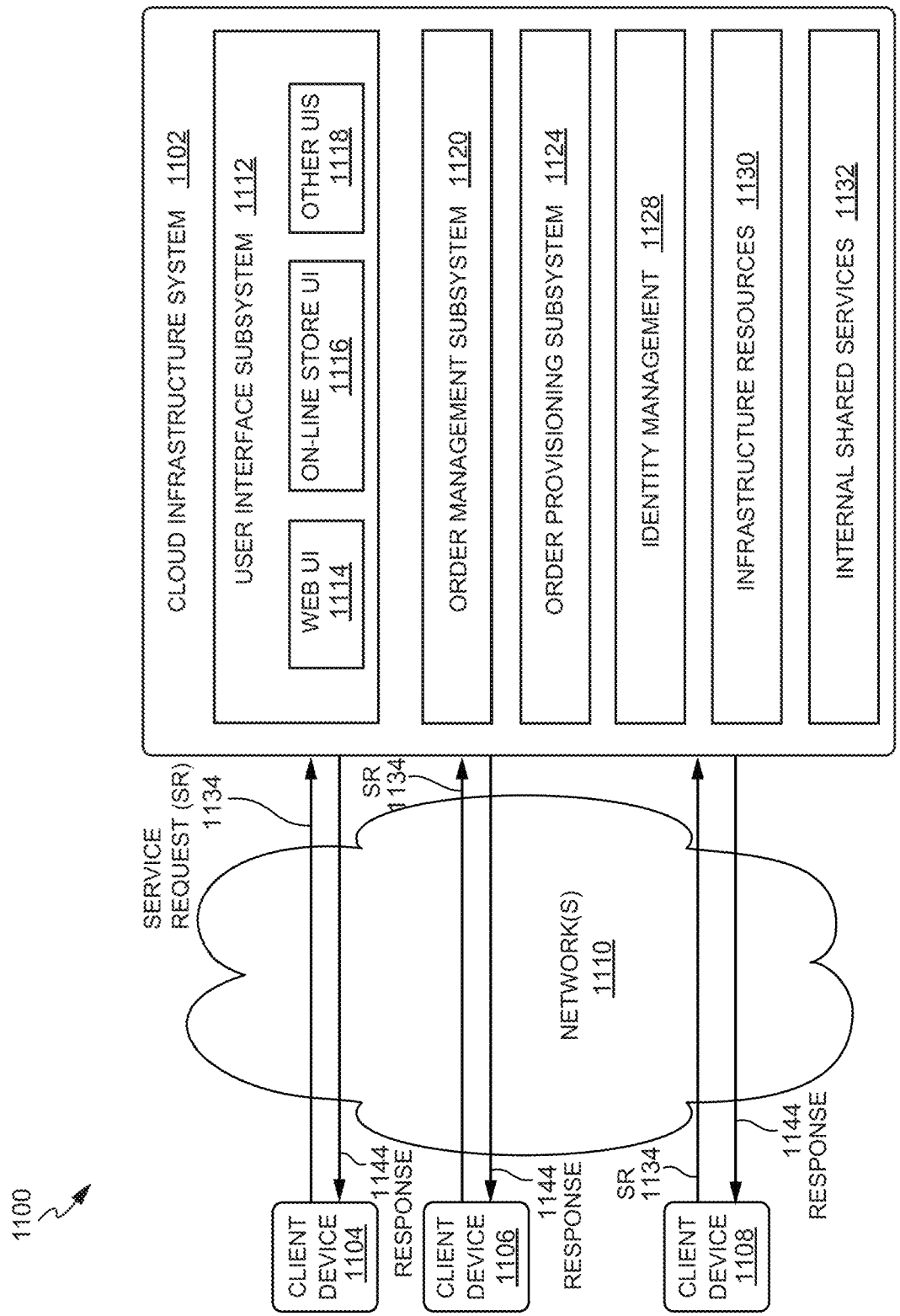
FIG. 11 is a simplified block diagram of one or more components of a system environment by which services provided by one or more components of an embodiment system may be offered as cloud services, in accordance with various embodiments.

In certain embodiments, developing and deploying a version of a compute processing functionalities described in this disclosure may be offered as services via a cloud environment. FIG. 11 is a simplified block diagram of a cloud-based system environment in which the development and deployment of a version of a compute may be offered as cloud services, in accordance with certain embodiments. In the embodiment depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The embodiment depicted in FIG. 11 is only one example of a cloud infrastructure system and is not intended to be limiting. It should be appreciated that, in some other embodiments, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative embodiments.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, the development and deployment a version of a compute. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer can be an individual or an enterprise. In certain other embodiments, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request development and deployment services described in this disclosure.

In some embodiments, the processing performed by cloud infrastructure system 1102 for providing business intelligent services may involve big data analysis. This analysis may involve using, analyzing, and manipulating large datasets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1102 for development and deployment of a version of a compute. The data used for this analysis may include structured data (e.g., data stored in a database or structured according to a structured model) and/or unstructured data (e.g., data blobs (binary large objects)).

As depicted in the embodiment in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like.

In certain embodiments, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a business intelligent related service offered by cloud infrastructure system 1102. As part of the order, the customer may provide information identifying complex and time-sensitive business scenarios to be solved.

In certain embodiments, such as the embodiment depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain embodiments, for a customer requesting business intelligence service, the response may include a request for complex and time-sensitive business scenarios to be solved.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain embodiments, cloud infrastructure system 1102 comprises an identity management subsystem (IMS) 1128 that is configured to manage customers information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
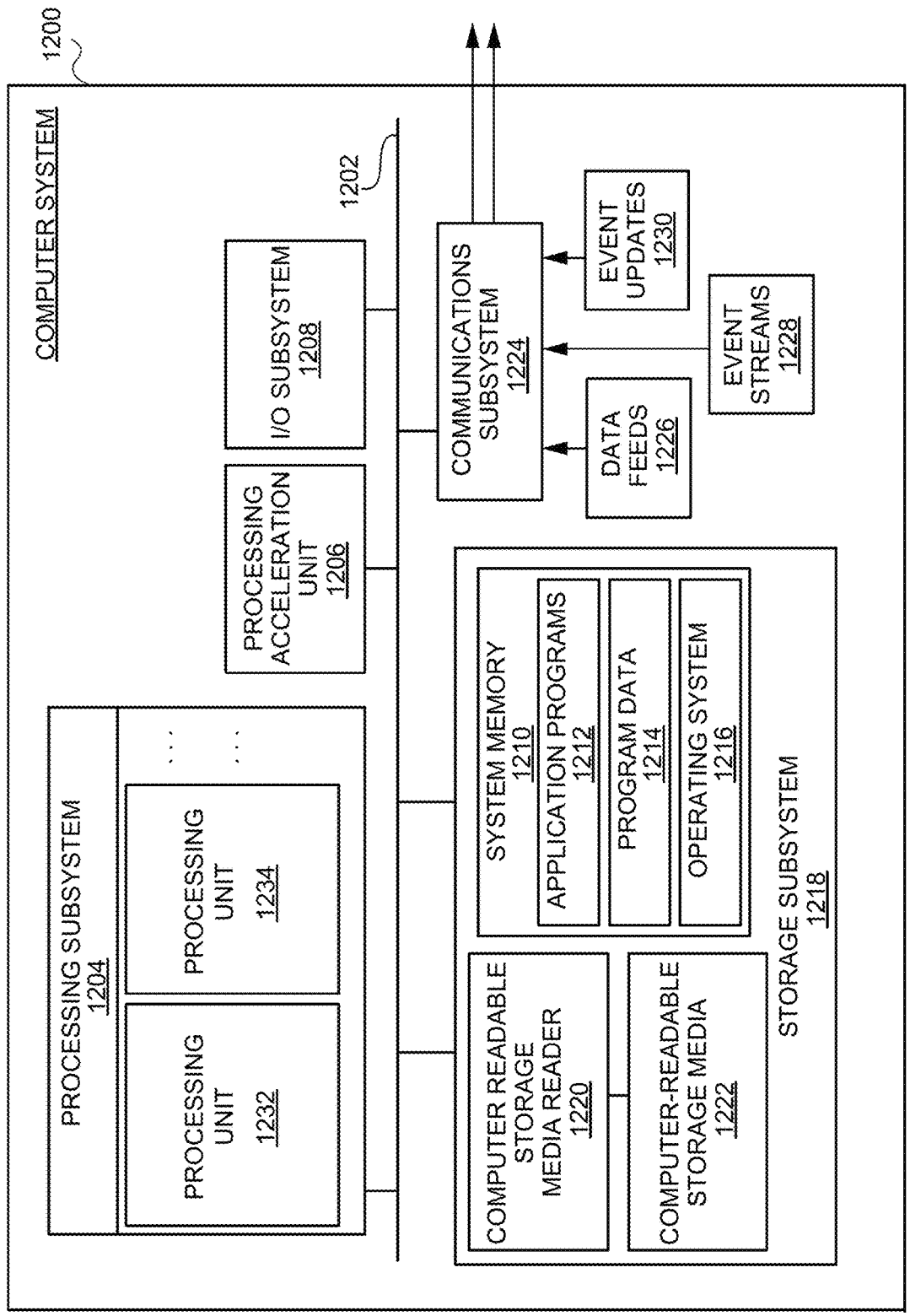
FIG. 12 illustrates an example computer system that may be used to implement various embodiments.

FIG. 12 illustrates an exemplary computer system 1200 that may be used to implement certain embodiments. For example, in some embodiments, computer system 1200 may be used to implement any of the development and deployment processing systems and/or various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 can be organized into one or more processing units 1232, 1234, etc. A processing unit may include one or more processors, one or more cores from the same or different processors, a combination of cores and processors, or other combinations of cores and processors. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above. In instances where computer system 1200 is executing one or more virtual machines, one or more processing units may be allocated to each virtual machine.

In certain embodiments, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some embodiments. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide a repository for storing data used in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some embodiments. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1218 may also include a computer-readable storage media reader 1220 that can further be connected to computer-readable storage media 1222. Reader 1220 may receive and be configured to read data from a memory device such as a disk, a flash drive, etc.

In certain embodiments, computer system 1200 may support virtualization technologies, including but not limited to virtualization of processing and memory resources. For example, computer system 1200 may provide support for executing one or more virtual machines. In certain embodiments, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, the communication subsystem may be used to obtain data for the development and deployment of a version of a compute.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
generating, by a data processing system, a compute fitting defined requirements and capable of executing on a defined model objective, wherein the generating comprises recording logical building blocks that make up the compute and dependencies of the logical building blocks as mappings in order to maintain a record of lineage of the logical building blocks in dependency;
generating, by the data processing system, a deployable archive bundle of the compute with dependencies based on the record of the lineage of the logical building blocks in dependency;
analyzing, by the data processing system, performance of the compute with respect to a production compute deployed within a production environment, wherein the production compute fits the requirements and executes the model objective;
determining, by the data processing system, the performance of the compute is superior to the performance of the production compute based on the analyzing of the performances; and
in response to determining the performance of the compute is superior to the performance of the production compute, replacing, by the data processing system, the production compute in the production environment with the compute, wherein the replacing comprises unpacking the deployable archive bundle and deploying the compute in the production environment with dependencies based on the record of the lineage of the logical building blocks in dependency.

2. The method of claim 1, wherein the analyzing of the performances comprises a qualitative assessment and/or a quantitative assessment.

3. The method of claim 2, wherein the qualitative assessment comprises a user comparing outputs and one or more metrics of performance for the compute against the outputs and the one or more metrics for performance of the production compute, and determining whether the performance of the compute is superior to the performance of the production compute based on the comparing.

4. The method of claim 2, wherein the quantitative assessment comprises the data processing system comparing one or more metrics of performance for the production compute against a baseline performance, when the one or more metrics of performance for the production compute are less than the baseline performance, comparing the one or more metrics of performance for the compute against the baseline performance, and when the one or more metrics of performance for the compute are greater than the baseline performance, determining the performance of the compute is superior to the performance of the production compute.

5. The method of claim 1, wherein the compute is generated using preconfigured script paragraph templates as the logical building blocks and user defined links between the preconfigured script paragraph templates as the dependencies.

6. The method of claim 1, further comprising training, testing, and/or validating, by the data processing system, the compute for the model objective, wherein the training, testing, and/or validating generates one or more metrics of performance for the compute that is used in the analyzing the performance of the compute.

7. The method of claim 1, further comprising publishing, by the data processing system, the compute within a model repository such that the production environment is made aware of availability of the compute for use in the production environment.

8. A non-transitory computer-readable memory storing a plurality of instructions executable by one or more processors, the plurality of instructions comprising instructions that when executed by the one or more processors cause the one or more processors to perform operations comprising:
generating, by a data processing system, a compute fitting defined requirements and capable of executing on a defined model objective, wherein the generating comprises recording logical building blocks that make up the compute and dependencies of the logical building blocks as mappings in order to maintain a record of lineage of the logical building blocks in dependency;
generating, by the data processing system, a deployable archive bundle of the compute with dependencies based on the record of the lineage of the logical building blocks in dependency;
analyzing, by the data processing system, performance of the compute with respect to a production compute deployed within a production environment, wherein the production compute fits the requirements and executes the model objective;
determining, by the data processing system, the performance of the compute is superior to the performance of the production compute based on the analyzing of the performances; and
in response to determining the performance of the compute is superior to the performance of the production compute, replacing, by the data processing system, the production compute in the production environment with the compute, wherein the replacing comprises unpacking the deployable archive bundle and deploying the compute in the production environment with dependencies based on the record of the lineage of the logical building blocks in dependency.

9. The non-transitory computer-readable memory of claim 8, wherein the analyzing of the performances comprises a qualitative assessment and/or a quantitative assessment.

10. The non-transitory computer-readable memory of claim 9, wherein the qualitative assessment comprises a user comparing outputs and one or more metrics of performance for the compute against the outputs and the one or more metrics for performance of the production compute, and determining whether the performance of the compute is superior to the performance of the production compute based on the comparing.

11. The non-transitory computer-readable memory of claim 9, wherein the quantitative assessment comprises the data processing system comparing one or more metrics of performance for the production compute against a baseline performance, when the one or more metrics of performance for the production compute are less than the baseline performance, comparing the one or more metrics of performance for the compute against the baseline performance, and when the one or more metrics of performance for the compute are greater than the baseline performance, determining the performance of the compute is superior to the performance of the production compute.

12. The non-transitory computer-readable memory of claim 8, wherein the compute is generated using preconfigured script paragraph templates as the logical building blocks and user defined links between the preconfigured script paragraph templates as the dependencies.

13. The non-transitory computer-readable memory of claim 8, wherein the operations further comprise training, testing, and/or validating, by the data processing system, the compute for the model objective, wherein the training, testing, and/or validating generates one or more metrics of performance for the compute that is used in the analyzing the performance of the compute.

14. The non-transitory computer-readable memory of claim 8, wherein the operations further comprise publishing, by the data processing system, the compute within a model repository such that the production environment is made aware of availability of the compute for use in the production environment.

15. A system comprising:
one or more processors;
a memory coupled to the one or more processors, the memory storing a plurality of instructions executable by the one or more processors, the plurality of instructions comprising instructions that when executed by the one or more processors cause the one or more processors to perform operations comprising:
generating, by a data processing system, a compute fitting defined requirements and capable of executing on a defined model objective, wherein the generating comprises recording logical building blocks that make up the compute and dependencies of the logical building blocks as mappings in order to maintain a record of lineage of the logical building blocks in dependency;
generating, by the data processing system, a deployable archive bundle of the compute with dependencies based on the record of the lineage of the logical building blocks in dependency;
analyzing, by the data processing system, performance of the compute with respect to a production compute deployed within a production environment, wherein the production compute fits the requirements and executes the model objective;
determining, by the data processing system, the performance of the compute is superior to the performance of the production compute based on the analyzing of the performances; and
in response to determining the performance of the compute is superior to the performance of the production compute, replacing, by the data processing system, the production compute in the production environment with the compute, wherein the replacing comprises unpacking the deployable archive bundle and deploying the compute in the production environment with dependencies based on the record of the lineage of the logical building blocks in dependency.

16. The system of claim 15, wherein the analyzing of the performances comprises a qualitative assessment and/or a quantitative assessment.

17. The system of claim 16, wherein the qualitative assessment comprises a user comparing outputs and one or more metrics of performance for the compute against the outputs and the one or more metrics for performance of the production compute, and determining whether the performance of the compute is superior to the performance of the production compute based on the comparing.

18. The system of claim 16, wherein the quantitative assessment comprises the data processing system comparing one or more metrics of performance for the production compute against a baseline performance, when the one or more metrics of performance for the production compute are less than the baseline performance, comparing the one or more metrics of performance for the compute against the baseline performance, and when the one or more metrics of performance for the compute are greater than the baseline performance, determining the performance of the compute is superior to the performance of the production compute.

19. The system of claim 18, wherein the compute is generated using preconfigured script paragraph templates as the logical building blocks and user defined links between the preconfigured script paragraph templates as the dependencies.

20. The system of claim 15, wherein the operations further comprise training, testing, and/or validating, by the data processing system, the compute for the model objective, wherein the training, testing, and/or validating generates one or more metrics of performance for the compute that is used in the analyzing the performance of the compute.

* * * * *